United States Patent
Danilov et al.

(10) Patent No.: US 10,528,260 B1
(45) Date of Patent: Jan. 7, 2020

(54) OPPORTUNISTIC 'XOR' OF DATA FOR GEOGRAPHICALLY DIVERSE STORAGE

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 169 days.

(21) Appl. No.: 15/794,950

(22) Filed: Oct. 26, 2017

(51) Int. Cl.
*G06F 12/00* (2006.01)
*G06F 3/06* (2006.01)
*G06F 11/14* (2006.01)

(52) U.S. Cl.
CPC ............ *G06F 3/0608* (2013.01); *G06F 3/065* (2013.01); *G06F 3/067* (2013.01); *G06F 3/0619* (2013.01); *G06F 3/0647* (2013.01); *G06F 11/1446* (2013.01); *G06F 11/1458* (2013.01); *G06F 11/1471* (2013.01)

(58) Field of Classification Search
CPC ...... G06F 3/0608; G06F 3/0619; G06F 3/065; G06F 3/067; G06F 3/0646; G06F 6/0647; G06F 11/1446; G06F 3/1458; G06F 3/1471
See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 8,370,542 B2 * | 2/2013 | Lu ................ G06F 3/0613 710/33 |
| 8,495,465 B1 | 7/2013 | Anholt et al. |
| 8,832,234 B1 | 9/2014 | Brooker et al. |
| 8,972,478 B1 | 3/2015 | Storer et al. |
| 9,063,838 B1 | 6/2015 | Boyle et al. |
| 10,361,810 B2 | 7/2019 | Myung et al. |
| 2002/0166026 A1 | 11/2002 | Ulrich et al. |
| 2005/0140529 A1 | 6/2005 | Choi et al. |

(Continued)

OTHER PUBLICATIONS

Office Action dated Nov. 16, 2018 for U.S. Appl. No. 15/662,273, 19 pages.

(Continued)

*Primary Examiner* — Shawn X Gu
(74) *Attorney, Agent, or Firm* — Amin, Turocy & Watson, LLP

(57) ABSTRACT

Opportunistic combining of data chunks is disclosed. Data chunks stored in storage devices of different zones of a zone storage system can be convolved to conserve memory. The zone storage system can be a geographically diverse storage system. A convolved chunk can be stored at a zone that does not contribute a local data chunk to the data represented in the convolved chunk. A zone storage component can be androgynous, rather than being explicitly configured to act as a front/back end storage device. This androgyny can enable the zone storage system to store a complete chunk at a zone based on real time use. In an aspect, an androgynous zone storage component can take on, or transition between, a de facto front-end storage device character or de facto back-end storage device character in response to deployment of the androgynous zone storage component in the storage system.

20 Claims, 10 Drawing Sheets

(56) References Cited

U.S. PATENT DOCUMENTS

| | | |
|---|---|---|
| 2006/0075007 A1 | 4/2006 | Anderson et al. |
| 2007/0239759 A1 | 10/2007 | Shen et al. |
| 2008/0320061 A1 | 12/2008 | Aszmann et al. |
| 2010/0031060 A1 | 2/2010 | Chew et al. |
| 2011/0138148 A1 | 6/2011 | Friedman et al. |
| 2011/0246503 A1 | 10/2011 | Bender et al. |
| 2012/0023291 A1 | 1/2012 | Zeng et al. |
| 2012/0204077 A1 | 8/2012 | D'Abreu et al. |
| 2012/0317234 A1 | 12/2012 | Bohrer et al. |
| 2013/0054822 A1 | 2/2013 | Mordani et al. |
| 2013/0088501 A1 | 4/2013 | Fell |
| 2013/0097470 A1 | 4/2013 | Hwang et al. |
| 2013/0246876 A1 | 9/2013 | Manssour et al. |
| 2014/0280375 A1 | 9/2014 | Rawson et al. |
| 2016/0055054 A1 | 2/2016 | Patterson, III et al. |
| 2016/0357649 A1 * | 12/2016 | Karrotu ............... G06F 11/2094 |
| 2017/0003880 A1 | 1/2017 | Fisher et al. |
| 2017/0102993 A1 | 4/2017 | Hu et al. |
| 2018/0063213 A1 | 3/2018 | Bevilacqua-Linn et al. |
| 2018/0129417 A1 | 5/2018 | Sivasubramanian et al. |
| 2019/0028179 A1 | 1/2019 | Kalhan |

OTHER PUBLICATIONS

Non-Final Office Action received for U.S. Appl. No. 15/651,504 dated Mar. 21, 2019, 10 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Office Action dated Nov. 1, 2019 for U.S. Appl. No. 15/656,382, 47 pages.

Office Action dated Nov. 26, 2019 for U.S. Appl. No. 15/952,179, 52 pages.

Office Action dated Nov. 25, 2019 for U.S. Appl. No. 16/024,314, 42 pages.

Office Action dated Dec. 2, 2019 for U.S. Appl. No. 16/177,278, 55 pages.

* cited by examiner

US 10,528,260 B1

OPPORTUNISTIC 'XOR' OF DATA FOR GEOGRAPHICALLY DIVERSE STORAGE

TECHNICAL FIELD

The disclosed subject matter relates to data convolution, more particularly, to creating convolved data blocks among geographically diverse storage devices in an opportunistic manner.

BACKGROUND

Conventional data storage techniques can employ convolution and deconvolution of data to conserve storage space. As an example, convolution can allow data, to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example Elastic Cloud Storage offered by Dell EMC. Bulk storage can, in an aspect, manage disk capacity via partitioning of disk space into blocks of fixed size, frequently referred to as chunks, for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk becomes full enough, it can be sealed so that the data therein is generally not able for further modification. These chunks can be then stored in a geographically diverse manner to allow for recovery of the data where a first copy of the data is destroyed, e.g., disaster recovery, etc.

DETAILED DESCRIPTION

Figure 1:
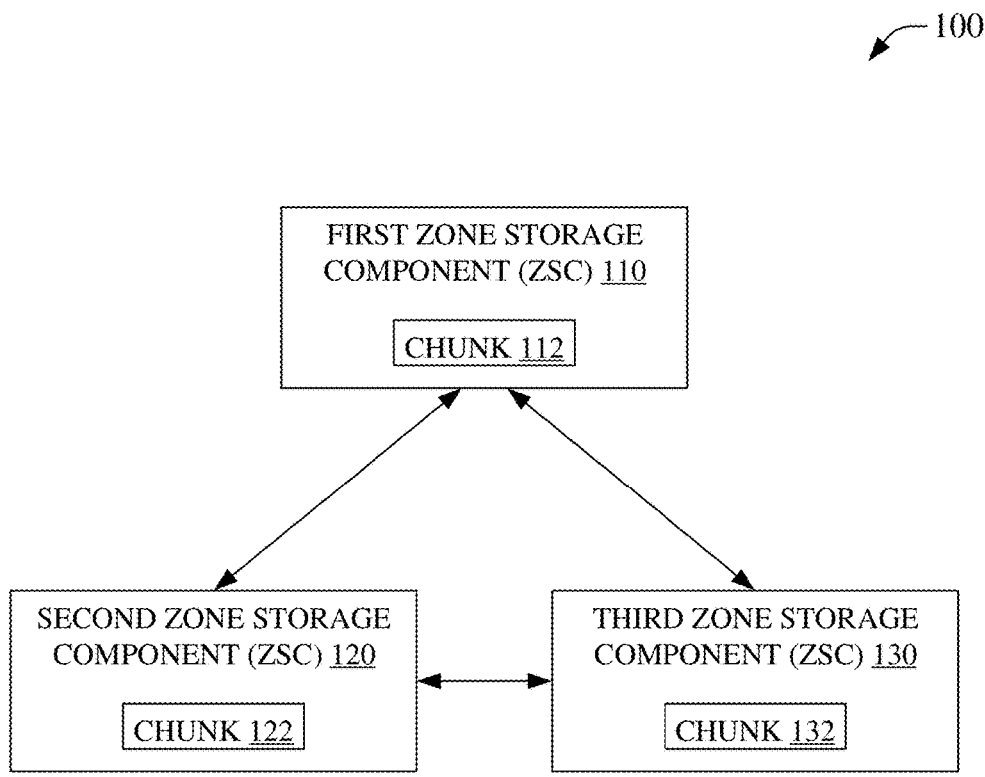
FIG. 1 is an illustration of an example system that can facilitate geographically diverse storage of data, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. Blocks of data, hereinafter 'data chunks', or simply 'chunks', can be used to store user data. Chunks can be shared among the same or different users, e.g., a typical chunk can contain fragments of different user data objects. Chunk contents can be modified, for example, in an append-only mode to prevent overwriting of data already added to the chunk, etc. As such, for a typical append-only chunk that is determined to be full, the data therein is generally not able to be further modified. Eventually the chunk can be stored 'off-site', e.g., in a geographically diverse manner, to provide for disaster recovery, etc. Chunks from a data storage device located in a first geographic location, hereinafter a 'zone storage component', 'zone storage device', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

In a conventional geographically diverse data storage system, chunks from front-end storage devices can be stored on a back-end storage device, e.g., storage devices are generally designated, configured, etc., explicitly as a user-facing storage device that create chunks from received user data, e.g., configured as front-end storage devices, or explicitly as non-user-facing storage devices that store chunks from front-end devices but that typically don't receive user data to create new chunks, e.g., configured as back-end storage devices. Generally a front-end storage device and a back-end storage device are not interchangeable without re-configuration to an operator designated front-end or back-end data storage role.

Geographically diverse data storage can use data compression to store data. As an example, a back-end storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an 'XOR' operation, into a different chunk to allow recovery of the Seattle or San Jose data from the convolved chunk, but where the convolved chunk typically consumes less storage space than the sum of the storage space for both the Seattle and San Jose chunks individually. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used by a compressed chunk at a geographically distinct location.

A convoled chunk stored at a geographically diverse back-end storage device can comprise data from all front-end storage devices of a geographically diverse storage system. As an example, where there are five front-end storage devices and one back-end storage device, the back-end storage device can convolve chunks from all five of the front-end storage devices to create a 'backup' of the data from the front-end storage devices. In this example, the back-end storage device can create a backup chunk only after all five of the front-end chunks are received. However, this can lead to imbalances in the front-end storage devices because some front-end storage devices can create chunks faster than other front-end storage devices, but they may not be able to further process their local chunks until it is indicated that the contributed chunks have been compressed on a back-end storage device. Where the back-end storage device waits to create the compressed chunk, e.g., until all front-end storage devices provide a corresponding chunk, the front-end storage devices can continue to amass further chunks as new user data is received. This can result in some front-end storage devices having more chunks, which consume more storage space on the corresponding zone storage device, than other front-end storage devices that are generating new chunks more slowly, for example, where users are not inputting data in the same volume as experienced by the other front-end storage devices.

In an embodiment of the disclosed subject matter, 'partial backup chunks' can be created, e.g., a partial backup chunk can comprise data convolved from less than all of the chunks from the several 'zones' in a geographically diverse storage system. The partial backup chunk, hereinafter 'partial chunk', or other similar term, can be stored until the remaining front end chunks are received. A partial chunk can be distinguished from a 'complete chunk' that can comprise data from each of the example several zones in the geographically diverse storage system. Moreover, the partial chunk and complete chunk can be distinguished from a 'local chunk' that can generated based on received user data rather than being comprised of data from other chunks. As such, a local chunk can be a newly created chunk that can be compressed with another local chunk to form a partial chunk. The partial chunk can then be compressed with other local chunks or partial chunks to form a complete chunk, e.g., where the complete chunk comprises data from all but the back-end zone of the geographically diverse storage system. Of note, where the geographically diverse storage system comprises only three zones, the local chunk from the first and second zones can be compressed into a complete chunk, rather than a partial chunk, at the third zone.

Compression of local chunks can be performed via different geographically diverse storage system morphologies. In an embodiment, all of the chunks from the all of the front end devices can be collected prior to compression into a complete chunk, e.g., data from all front-end zones can be copied to the back-end zone prior to compression into a complete chunk stored on the back-end storage. In another embodiment, chunks from the front end devices can be collected as they become available and compressed with other chunks at the back-end zone, e.g., as back-end partial chunks, until a complete chunk is eventually generated, e.g., data from front-end zones can be copied to the back-end zone and compressed iteratively as another front-end zone chunk is received, until a complete chunk is stored on the back-end storage. The compression of local chunks in a partial or complete chunk can be performed, for example, 1) at a front-end device, either de facto or explicitly configured as a front-end device, whereby the partial or complete chunk can then be stored on a back-end device, again either de facto or explicitly configured as a back-end device; 2) at a back-end device, either de facto or explicitly configured as a back-end device, whereby the partial or complete chunk can then be stored on a back-end device, again either de facto or explicitly configured as a back-end device; or 3) at another device, such as a network device, server, virtual machine, etc., whereby the partial or complete chunk can then be stored on a back-end device, either de facto or explicitly configured as a back-end device.

In a further embodiment, chunks from zone storage devices can be compressed to form partial chunks on other zone storage devices. In this embodiment, a front-end device and back-end device need not, but can, be designated, configured etc. The partial chunks in this embodiment can then be compressed with other local chunks or partial chunks, in an iterative manner, until a complete chunk is created at a last zone storage device that has not contributed a local chunk to the complete chunk, this last zone storage device becomes a de facto back-end storage device and the zone storage devices correlated to the contributed local chunks become de facto front-end storage devices.

Of note, in this embodiment, the zone storage devices can comprise storage devices that are not explicitly configured or designated as front/back-end storage devices, these can be termed 'androgynous' zone storage components. However, this embodiment does not preclude the use of storage devices explicitly designated or configured as front/back-end storage devices. As an example, a geographically diverse storage system can comprise an androgynous zone storage component and other zone storage devices explicitly configured as front/back-end storage devices. As a further example, a geographically diverse storage system can comprise all androgynous zone storage components that typically assume a de facto role, e.g., as a front/back-end storage device, as a result of their placement in the geographically diverse storage system by a network operator. As such, geographically diverse storage system design can affect the character of an androgynous zone storage component, for example, an androgynous zone storage component deployed in a geographically diverse storage system to receive user data can de facto act as a front-end storage device, while an androgynous zone storage component deployed in the geographically diverse storage system so that it does not receive user data for placement into a local chunk can de facto act as a back-end storage device, etc.

An androgynous zone storage component can interchange roles without reconfiguration to the new role. As an example, an androgynous zone storage component acting as a de facto back-end storage device can change character and act as a front-end storage device where it begins to receive user data for creation of new local chunks. Similarly, a de facto front-end data store implemented with an androgynous zone storage component an act as a back-end data store where it no longer receives user data for incorporation into a local chunk. Moreover, an androgynous zone storage device(s) can be added to, removed from, swapped with, etc., other zone storage devices of a geographically diverse storage system. Further, a first geographically diverse storage system and a second geographically diverse storage system can be wholly or partially merged or diverged where they employ an androgynous zone storage device(s), such that less explicit reconfiguration is needed than can be experience in conventional storage systems. As examples, a three storage device system can be expanded into a four or more storage device system, a three storage device system can be merged with another storage device system and the androgynous storage devices can store a backup chunk according to the presently discloses subject matter, storage systems can be broken apart into multiple smaller storage systems, storage devices can be taken off-line and the corresponding storage system can adapt on the fly, etc. In an embodiment, an androgynous zone storage device can be comprised in both a first geographically diverse storage system and a second geographically diverse storage system, wherein the androgynous zone storage device can act as a de facto front-end device in the first geographically diverse storage system, and act as a de facto back-end device in the second geographically diverse storage system. In this embodiment, the androgynous zone storage device, acting as a de facto front-end device, can receive user data and create a local chunk that can then be stored/compressed at a back-end device of the first geographically diverse storage system, while also acting as a de facto back-end device in the second geographically diverse storage system, where the androgynous zone storage device can store/compress data chunks from other zones of the second geographically diverse storage system.

Compression of chunks can be performed by different compression technologies. Logical operations can be applied to chunk data to allow compressed data to be recoverable, e.g., by reversing the logical operations to revert to the initial chunk data. As an example, data from chunk 1 can undergo an exclusive-or operation, hereinafter 'XOR', with data from chunk 2 to form chunk 3. In this example, chunks 1 and 2 can be local chunks, wherein chunk 1 is from zone 1 and chunk 2 is from zone 2, and chunk 3 can be a partial chunk stored at zone 3 where the geographically diverse storage system comprises more than three zones, or can be a complete chunk stored at zone 3 where the geographically diverse storage system comprises only three zones. While other logical operations can be employed in compression of chunks, those operations are generally beyond the scope of the presently disclosed subject matter and, for clarity and brevity, only the XOR operator will be illustrated herein. However, it is noted that the disclosure is not so limited and that other operations or combinations of operations can be substituted without departing from the scope of the present disclosure. As such, all logical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, resulting a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '$\oplus$', etc., where the data in the Seattle and Dallas local chunks can be convolved by XOR processes to form the Boston chunk, e.g., $C=A1 \oplus B1$, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter can be applied to data of a single disk, memory, drive, data storage device, etc., without departing from the scope of the disclosure, e.g., the zones represent different logical areas of the single disk, memory, drive, data storage device, etc. Moreover, it will be noted that convolved chunks can be further convolved with other data, e.g., $D=C1 \oplus E1$, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate geographically diverse storage of data, in accordance with aspects of the subject disclosure. System 100 can comprise three or more zone storage components (ZSCs), e.g., first ZSC 110, second ZSC 120, third ZSC 130, etc. The ZSCs can communicate with the other ZSCs of system 100. In an embodiment, a geographically diverse storage system can comprise system 100. In an embodiment, one or more of the ZSCs, e.g., 110-130, etc., can be an androgynous zone storage component. As an example, first ZSC 110, second ZSC 120, and third ZSC 130, can each be an androgynous zone storage component, whereby their roles or character in an example geographically diverse storage system can result from their use in the geographically diverse storage system rather than by explicitly configuring them as either front-end or back-end devices. Continuing the example, first ZSC 110 can receive user data that becomes part of chunk 112, whereby chunk 112 can be regarded as a local chunk. This can cause first ZSC 110 to assume a front-end device character in the corresponding geographically diverse storage system. Similarly, second ZSC 120 can receive user data that is then comprised in local chunk 122 and second ZSC 120 can act as a de facto front-end device in the geographically diverse storage system. Moreover, third ZSC 130 can store chunk 132, wherein chunk 132 can embody convoluted data corresponding to chunks 112 and 122, e.g., as a partial or complete chunk, whereby third ZSC 130 can act as a de facto back-end device. In an embodiment chunk 132 can be an XOR of chunks 112 and 122.

System 100 can enable data recovery. In an embodiment, chunk 112 can be recovered based on chunk 122 and chunk 132; chunk 122 can be recovered based on chunk 112 and chunk 132; etc. Where first ZSC 110, second ZSC 120, third ZSC 130, etc., are located in geographically diverse locations, the possibility of complete data loss can be reduced, e.g., where first ZSC 110 is in Seattle, second ZSC 120 is in San Jose, third ZSC 130 is in Boston, etc., an earthquake in Seattle can damage chunk 112 but is unlikely to affect chunks 122 or 132 because they are located far from the earthquake in Seattle, and accordingly, chunks 122 and 132 can be employed to recover chunk 112.

In an embodiment, not all ZSCs need to be androgynous zone storage components. As an example, first ZSC 110 can be configured as a front-end device, second ZSC 120 can be an androgynous zone storage component, and third ZSC 130 can be configured as a back-end device. In this example, second ZSC 120 can receive user data that can be incorporated into chunk 122, whereby second ZSC 120 can take on a de facto front-end device character. This can allow for an androgynous zone storage component to be incorporated into existing storage systems in a seamless manner.

In another embodiment, the character of the ZSCs can be adapted based on their use. As an example, first ZSC 110, second ZSC 120, and third ZSC 130, can be androgynous zone storage components. In this example, first ZSC 110 and second ZSC 120 can assume a front-end device character based on their receiving user data used to form local chunks, e.g., chunk 112 and 122. Similarly, in this example, third ZSC 130 can act as a de facto back-end device and can store chunk 132 comprising convolved data from chunks 112 and 122. Continuing the example, at a future time third ZSC 130 can begin receiving user data used to form a local chunk, not illustrated, while second ZSC 120 can stop receiving user data for forming local chunks. As such, third ZSC 130 can begin to act as a front-end device and new chunks from first ZSC 110 and third ZSC 130 can be compressed for storage on second ZSC 120, which can now act as a de facto back-end device.

Of note, the adaptation of the ZSCs characters can be automatic and based on which ZSCs of a given storage system are creating local chunks and which are not creating local chunks. In an aspect, for a storage system having M zones, with M ZSCs, local chunks corresponding to $ZSC_1$ to through $ZSC_{(M-1)}$ can be compressed for storage on $ZSC_M$ by various techniques. As such, one or more of the M ZSCs in the storage system can act as either de facto front-end or back-end device.

Moreover, because an androgynous zone storage component is typically not explicitly configured as a front/back-end device, the example M ZSCs can 'evolve' into de facto front/back-end devices based on actual use in a storage system. As an example, where there are five ZSCs, user data can be received at a 3rd ZSC, causing it to assume a de facto front-end character; next a 5th ZSC can receive user data, causing it to then assume a de facto front-end character. The example storage system can then generate a first partial chunk from the 3rd and 5th ZSC chunks, denoted 'XOR(3, 5)', for storage on any of the 1st, 2nd, or 4th ZSC. Continuing the example, assume the first partial chunk is stored on the 1st ZSC, thereby causing the 1st ZSC to assume a back-end character. However, subsequently the 1st ZSC can receive user data and form a local chunk, causing the 1st ZSC to transition to a de facto front-end character. The storage system can then generate a second partial chunk from XOR(3,5) and the local chunk of the 1st ZSC, denoted 'XOR(1,XOR(3,5))' or more simply 'XOR(1,3,5)', for storage on any of the 2nd or 4th ZSC. For this example XOR(1,3,5) can be stored at the 2nd ZSC and the 2nd ZSC can assume a de facto back-end character. Again continuing the example, the 4th zone can receive data to create a local chunk at the 4th ZSC, whereby the 4th ZSC can assume a de facto front-end character. The 4th ZSC local chunk can be compressed with XOR(1,3,5) for storage at the 2nd ZSC as a complete chunk, e.g., a chunk from all but the acting back-end device, and the complete chunk can be denoted as 'XOR(4,XOR(1,XOR(3,5)))', 'XOR(4,XOR(1,3,5))', or 'XOR(1,3,4,5)'.

Accordingly in the current example, the 2nd zone can retain the de facto back-end character, the 1st, 4th, and 5th ZSC can retain the de facto front-end character, and the 3rd ZSC can dynamically adapt, in response to beginning to store a local chunk, from a de facto back-end character to a de facto front-end character. Of note, aspects of the several disclosed embodiments can also be combined without departing from the scope of the subject disclosure. This can be illustrated with the current example where the 1st ZSC can be configured as a front-end device rather than being an androgynous zone storage component; or where the 2nd ZSC can be configured as a back-end device rather than being an androgynous zone storage component. In the above example, the 3rd ZSC is an androgynous zone storage component, which allows it to dynamically change from a de facto front-end to back-end device, which would not typically be possible for an explicitly configured front/back-end device without explicit reconfiguration.

Figure 2:
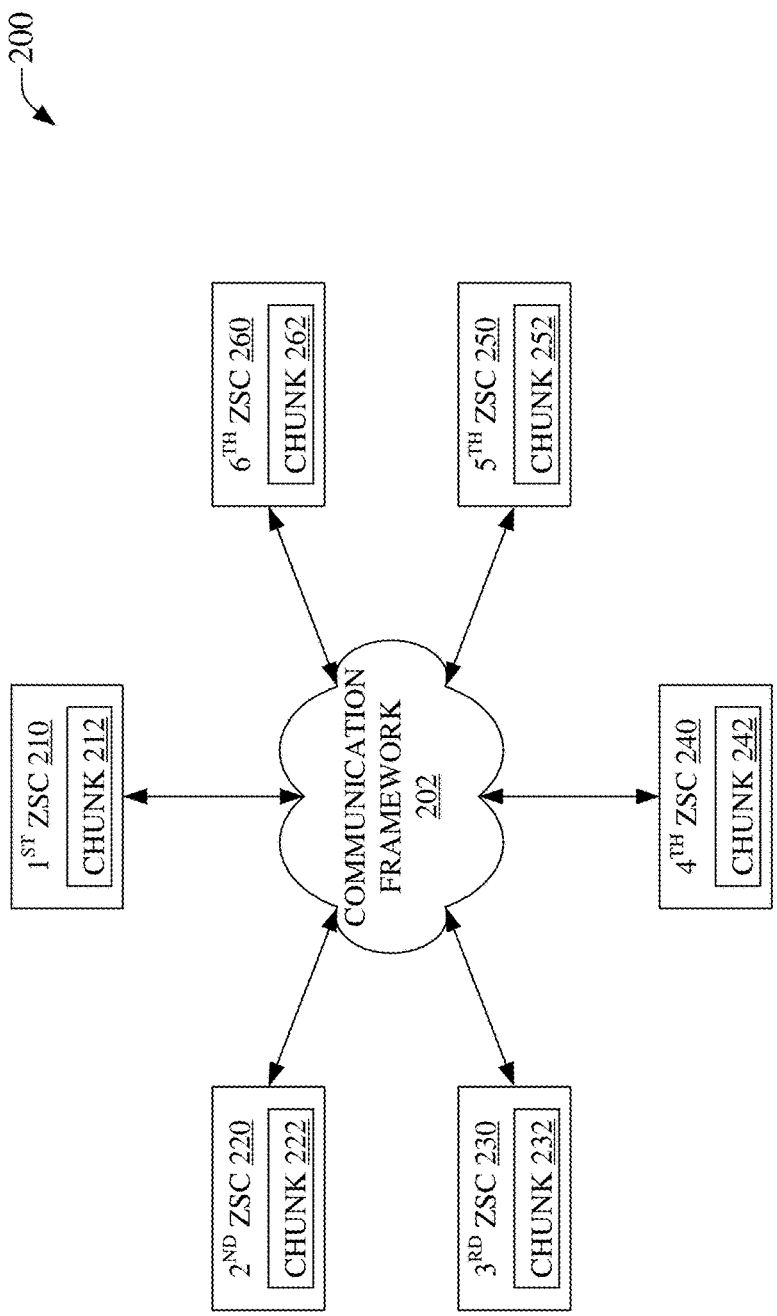
FIG. 2 is an illustration of an example system that can facilitate opportunistic geographically diverse storage of data via a communication framework, in accordance with aspects of the subject disclosure.

FIG. 2 is an illustration of a system 200, which can enable opportunistic geographically diverse storage of data via a communication framework, in accordance with aspects of the subject disclosure. System 200 can comprise, for example, six zones with corresponding ZSCs, e.g., 1st ZSC 210, 2nd ZSC 220, 3rd ZSC 230, 4th ZSC 240, 5th ZSC 250, 6th ZSC 260, etc. The ZSCs can be communicatively coupled via communication framework 202. Communication framework 202 can comprise wired connections, wireless connections, or combinations thereof. As an example communication framework 202 can comprise a millimeter wavelength link from 1st ZSC 210 to a base station, not illustrated, connected via the internet, not illustrated, and via a local area network, not illustrated, to 2nd ZSC 220, etc.

In an embodiment, system 200 can compress chunks from, for example, the first five zones, e.g., chunks 212, 222, 232, 242, 252, etc., for storage on 6th ZSC 260 as chunk 262. In an aspect, chunk 262 in this example can be a complete chunk. In an embodiment, chunks 212, 222, 232, 242, and 252 can be replicated at 6th ZSC 260, where they can be compressed into chunk 262. In another embodiment, chunks 212, 222, 232, 242, and 252 can be compressed at another device and stored at 6th ZSC 260 as chunk 262. In a further embodiment, chunk 212 and chunk 222 can be compressed and stored as a first partial chunk, not illustrated, at 3rd ZSC 230, then chunk 232 can be compressed with the first partial chunk and be stored at 4th ZSC 240 as a second partial chunk, not illustrated, whereby chunk 242 can be compressed with the second partial chunk for storage at 5th ZSC 250 as a third partial chunk that can then be compressed with chunk 252 for storage as a complete chunk, chunk 262, at 6th ZSC 260. Other embodiments can create other partial chunks comprising data from two or more zones for storage on another ZSC not contributing a chunk to the partial chunk to be stored. Some of these other embodiments are disclosed elsewhere herein. Moreover, all such embodiments are believed to be within the scope of the subject disclosure even where not explicitly recited herein.

Figure 3:
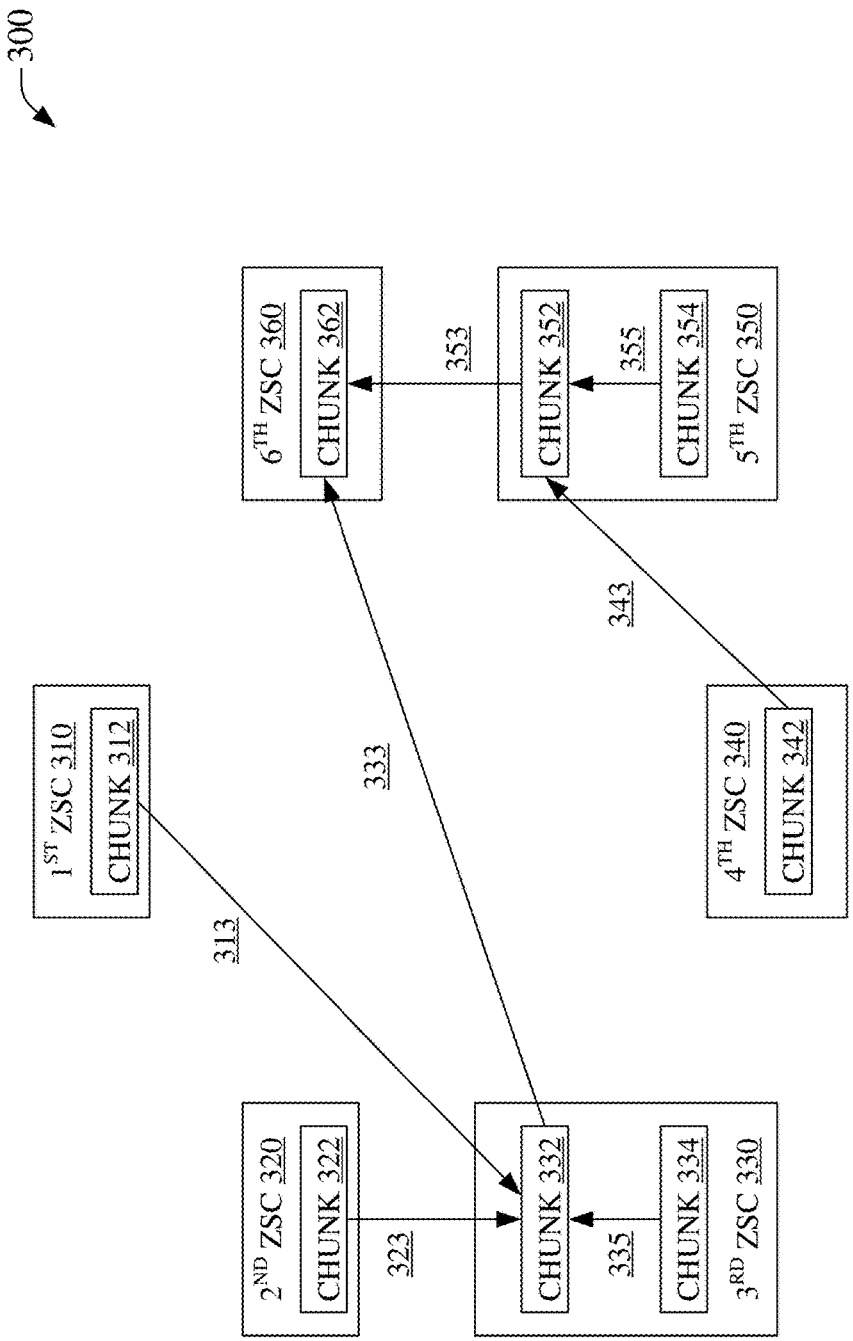
FIG. 3 is an illustration of an example system that can enable opportunistic geographically diverse storage of data employing a data chunk comprising data from less than all data zones of a group of data zones, in accordance with aspects of the subject disclosure.

FIG. 3 is an illustration of a system 300, which can facilitate opportunistic geographically diverse storage of data employing a data chunk comprising data from less than all data zones of a group of data zones, in accordance with aspects of the subject disclosure. System 300 can comprise, for example, six zones with corresponding ZSCs, e.g., 1st ZSC 310, 2nd ZSC 320, 3rd ZSC 330, 4th ZSC 340, 5th ZSC 350, 6th ZSC 360, etc. The ZSCs can be communicatively coupled to enable communication of data chunks at least as illustrated. In an aspect, the communicative coupling between ZSCs can be by a communication framework, for example, communication framework 202 as described elsewhere herein.

In an embodiment, 1st ZSC 310 and 2nd ZSC 320 can facilitate compression of chunk 312 and 322 for storage as a partial chunk, e.g., chunk 332 at 3rd ZSC 330. In an embodiment, chunk 312 can be replicated at 3rd ZSC 330 via communication link 313 and chunk 322 can be replicated at 3rd ZSC 330 via communication link 323 to enable compression at 3rd ZSC 330 into chunk 332. In another embodiment, not illustrated, chunks 312 and 322 can be communicated to another device via links 313 and 323 respectively, where they can be compressed for storage as chunk 332.

In an embodiment, chunk 334, a local chunk at 3rd ZSC 330, can be subsequently compressed into chunk 332, chunk 334 can then be compressed via link 333 into chunk 362 at 6th ZSC 360, such that chunk 334, which now comprises data from 3rd ZSC 330, is not also stored at 3rd ZSC 330. This embodiment can be denoted as chunk 332=XOR(chunk 334, XOR(chunk 332, chunk 312)). In a further embodiment, chunk 334, the local chunk at 3rd ZSC 330, can be simultaneously compressed into chunk 332 along with chunk 322 and chunk 312. Chunk 334 can then be compressed via link 333 into chunk 362 at 6th ZSC 360, such that chunk 334, which now comprises data from 3rd ZSC 330, is not also stored at 3rd ZSC 330. This embodiment can be denoted as chunk 332=XOR(chunk 334, chunk 332, chunk 312). Of note, XOR(chunk 334, XOR(chunk 332, chunk 312)) can be equivalent to XOR(chunk 334, chunk 332, chunk 312), other than the order of operations used to generate chunk 332.

In an embodiment, chunk 342, a local chunk at 4th ZSC 340, can be compressed with chunk 354, a local chunk at 5th ZSC 350, into partial chunk 352, via links 343 and 355 respectively, as illustrated. This can be denoted as chunk 352=XOR(chunk 342, chunk 354). Chunk 352 can then be compressed via link 353 into chunk 362 at 6th ZSC 360, such that chunk 352, which now comprises data from 5th ZSC 350, is not also stored at 5th ZSC 350. In an aspect, partial chunk 332 and partial chunk 352 can be compressed into complete chunk 362. This can be denoted as chunk 362=XOR(chunk 332, chunk 352), wherein chunk 352=XOR(chunk 342, chunk 354), and wherein chunk 332=XOR(chunk 334, chunk 332, chunk 312) or wherein chunk 332=XOR(chunk 334, XOR(chunk 332, chunk 312)). As previously noted, XOR(chunk 334, XOR(chunk 332, chunk 312)) can be equivalent to XOR(chunk 334, chunk 332, chunk 312), other than the order of operations used to generate chunk 332.

In an aspect, where 3rd ZSC 330 can be an androgynous zone storage component, 3rd ZSC 330 can act as a de facto back-end device where local chunk 334 is created after partial chunk 332 is stored. In another aspect, where 3rd ZSC 330 can be an androgynous zone storage component, 3rd ZSC 330 can act as a de facto front-end device where local chunk 334 exists prior to, and is embodied in the creation of partial chunk 332. Moreover, as disclosed elsewhere herein, where other ZSCs, e.g., from among ZSCs 310-360, etc., can be androgynous zone storage components, their front/back-end characters can be ambiguous until a de facto character is assumed by the ZSCs during use, for example, a character of 6th ZSC 360 can be undefined where it does not store a local chunk for the given storage system and it does not yet store complete chunk 362. However, upon storing complete chunk 362, the character of 6th ZSC 360 can be a de facto back-end character. Moreover, storage of a local chunk at 6th ZSC 360 for a second storage system may not affect the character of 6th ZSC 360 for a first storage system, e.g., 6th ZSC 360 can be employed in one or more different storage systems. As an example, 6th ZSC 360 can be a de facto back-end device in a first storage system and a de facto back-end device in a second storage system; can be a de facto back-end device in a first storage system and a de facto front-end device in a second storage system; can be a de facto front-end device in a first storage system and a de facto front-end device in a second storage system; etc. Similarly, the other ZSCs, e.g., 1st ZSC 310, 2nd ZSC 320, 3rd ZSC 330, 4th ZSC 340, 5th ZSC 350, etc., can participate in one or more storage systems and have a same or different character in each of the one or more storage systems.

Figure 4:
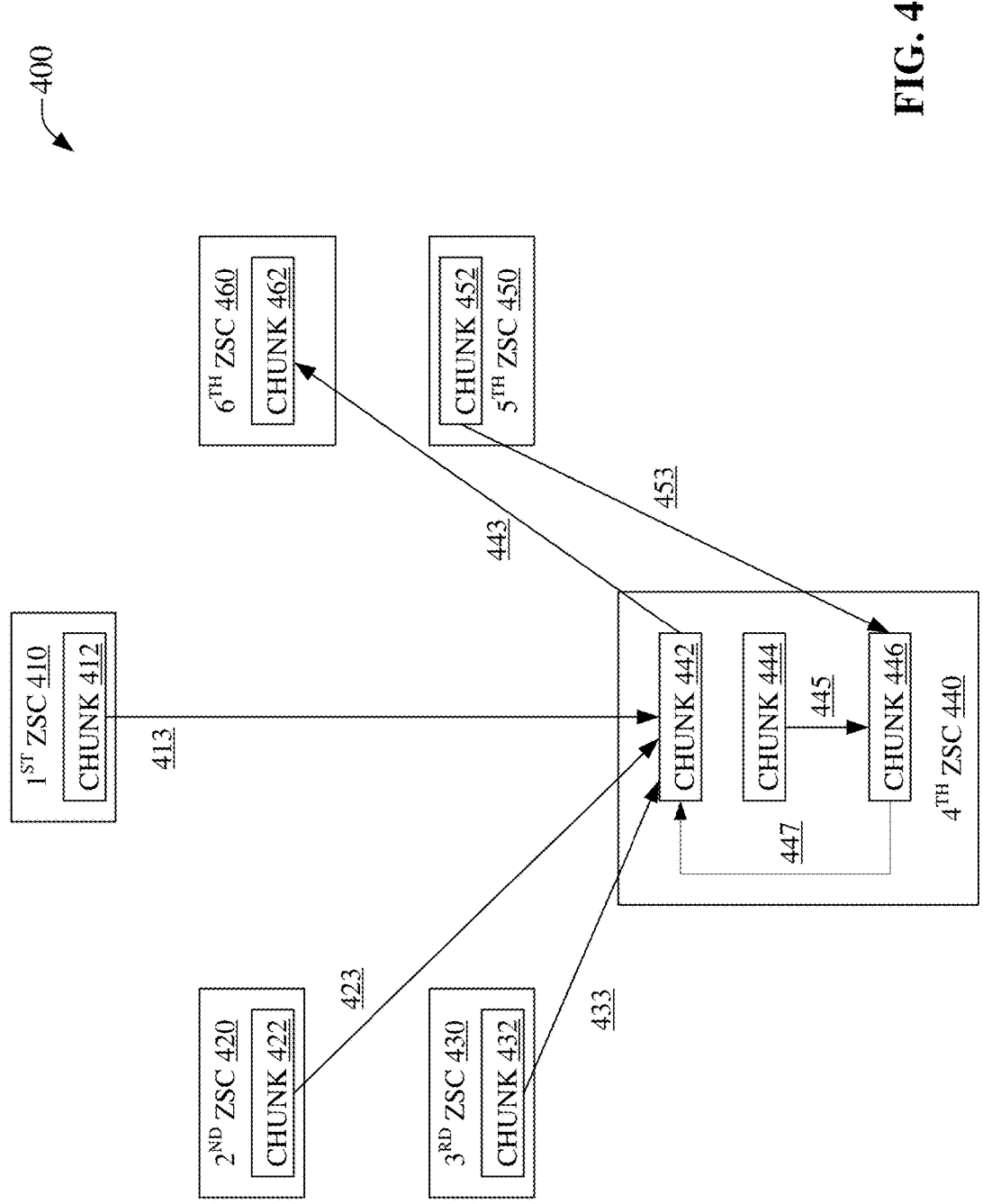
FIG. 4 illustrates an example system that can facilitate opportunistic geographically diverse storage of data employing a data chunk comprising data from less than all data zones of a group of data zones via an androgynous zone storage component, in accordance with aspects of the subject disclosure.

FIG. 4 is an illustration of a system 400, which can enable opportunistic geographically diverse storage of data employing a data chunk comprising data from less than all data zones of a group of data zones via an androgynous zone storage component, in accordance with aspects of the subject disclosure. System 400 can comprise, for example, six zones with corresponding ZSCs, e.g., 1st ZSC 410, 2nd ZSC 420, 3rd ZSC 430, 4th ZSC 440, 5th ZSC 450, 6th ZSC 460, etc. The ZSCs can be communicatively coupled to enable communication of data chunks at least as illustrated. In an aspect, the communicative coupling between ZSCs can be by a communication framework, for example, communication framework 202 as described elsewhere herein.

In an embodiment, 1st ZSC 410, 2nd ZSC 420, and 3rd ZSC 430, can facilitate compression of chunks 412, 422, and 432, for storage as a partial chunk, e.g., chunk 442 at 4th ZSC 440. In an embodiment, chunks 412, 422, and 432, can be replicated at 4th ZSC 440 via communication links 413, 423, and 433, respectively, to enable compression at 4th ZSC 440 into chunk 442. In another embodiment, not illustrated, two or more of chunks 412, 422, and 432, can be communicated to another device via links 413, 423, and 433 respectively, where they can be compressed for storage as chunk 442 at 4th ZSC 440.

In an embodiment, chunk 446, at 4th ZSC 440, can be subsequently compressed, via link 447, into chunk 442, chunk 442 can then be compressed via link 443 into chunk 462 at 6th ZSC 460, such that chunk 442, which now comprises data from 4th ZSC 440, is not also stored at 4th ZSC 440. This embodiment can be denoted as chunk 442=XOR(chunk 446, XOR(chunk 412, chunk 422, chunk 432)). In a further embodiment, chunk 446, at 4th ZSC 440, can be simultaneously compressed, via link 447, into chunk 442 along with chunks 432, 422 and 412. Chunk 442 can then be compressed via link 333 into chunk 462 at 6th ZSC 460, such that chunk 442, which now comprises data from 4th ZSC 440, is not also stored at 4th ZSC 440. This embodiment can be denoted as chunk 442=XOR(chunk 446, chunk 432, chunk 422, chunk 412). Of note, XOR(chunk 446, XOR(chunk 412, chunk 422, chunk 432)) can be equivalent to XOR(chunk 446, chunk 432, chunk 422, chunk 412). It is further noted that chunk 446 can be a partial chunk of chunk 444 and 452, via links 445 and 453 respectively.

In an aspect, where chunk 442 is created before chunk 446, chunk 442 can be written as 442=XOR(chunk 432, chunk 422, chunk 412), which can be updated after creation of chunk 446 to 442=XOR(chunk 446, chunk 432, chunk 422, chunk 412). In a further aspect, where chunk 442 is created after chunk 446, chunk 442 can be written as either 442=XOR(chunk 446, chunk 432, chunk 422, chunk 412) or as 442=XOR(chunk 446, XOR(chunk 412, chunk 422, chunk 432)), depending on the order of operations. Similarly, in some embodiments, the XOR technique can be iterative, for example, 442=XOR(chunk 446, XOR(chunk 432, XOR(chunk 412, chunk 422))), etc. In another aspect, where 4th ZSC 440 can be an androgynous zone storage component, 4th ZSC 440 can act as a de facto back-end device prior to storage of chunk 444. In another aspect, where 4th ZSC 440 can be an androgynous zone storage component, 4th ZSC 440 can act as a de facto front-end device where chunk 444 exists prior to, and is embodied in the creation of partial chunk 446. Further, 4th ZSC 440 can automatically transition between front/back-end character to reflect the use of 4th ZSC 440 in the storage system.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
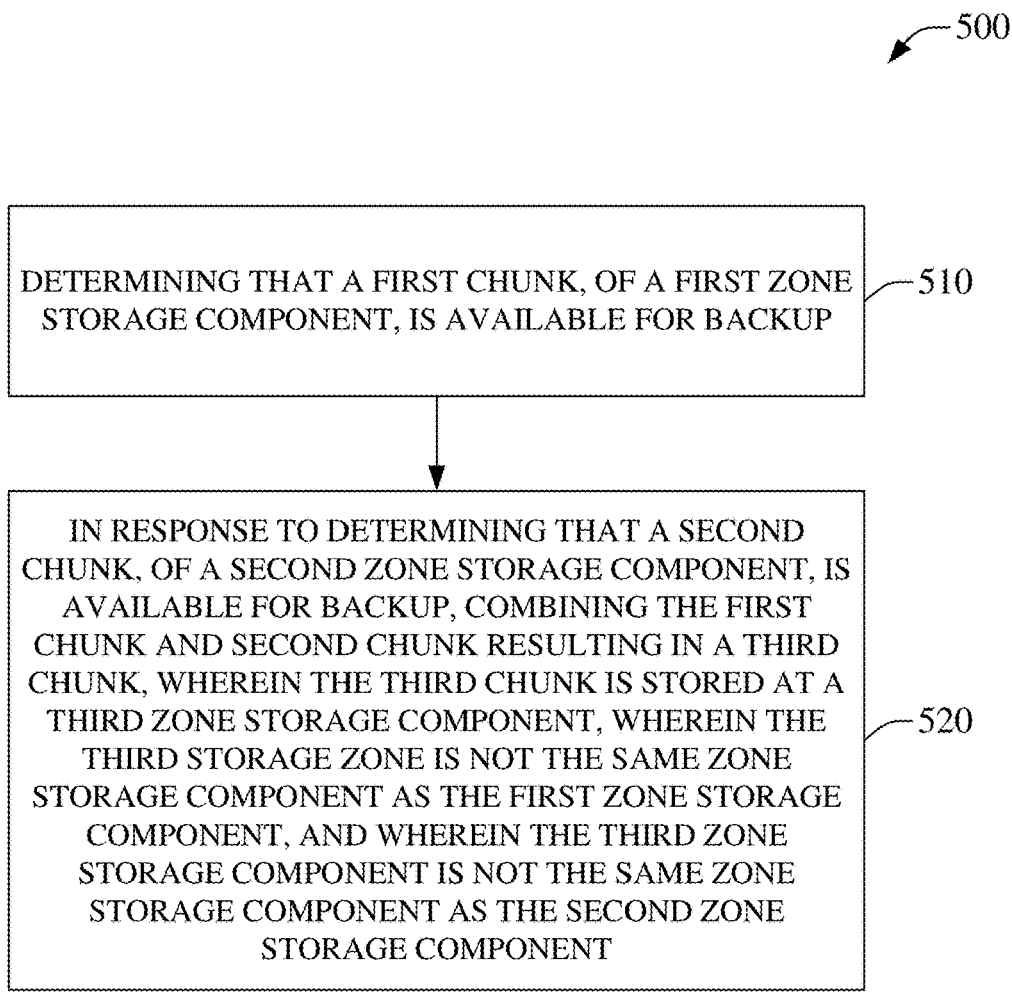
FIG. 5 is an illustration of an example method facilitating geographically diverse storage of data, in accordance with aspects of the subject disclosure.

FIG. 5 is an illustration of an example method 500, which can facilitate geographically diverse storage of data, in accordance with aspects of the subject disclosure. At 510, method 500 can comprise determining that a first chunk of a first zone storage component is available for backup. In an embodiment, the first zone storage component can be explicitly configured as a front-end device. In another embodiment, the first storage zone component can be an androgynous zone storage component and can act as a de facto front-end device. In an aspect, the first chunk can be a local chunk based on user input. In another aspect, the first chunk can be a partial chunk comprising, in a compressed form, data chunks from other zone storage components of a storage system. In an aspect, the storage system can be a geographically diverse storage system.

At 520, method 500 can comprise combining, in response to determining that a second chunk is available for backup, the first and second chunk into a third chunk. The second chunk can, in an embodiment, be a local chunk based on user input, be a partial chunk, etc. The third chunk can be a partial chunk or a complete chunk. In an embodiment, the second zone storage component can be explicitly configured as a front-end device, can be an androgynous zone storage component that can act as a de facto front-end device, etc. In an embodiment, the third zone storage component can be explicitly configured as a back-end device, can be an androgynous zone storage component that can act as a de facto back-end device, etc.

In an embodiment, the first zone storage component, the second zone storage component, and the third zone storage component can each be different zone storage components. Accordingly, the first chunk and second chunk can be compressed and stored at a zone storage component, e.g., the third zone storage component, that does not contribute a local chunk to the data stored on the third zone storage component. In an aspect, the third chunk can be denoted as 'third chunk=XOR(first chunk, second chunk)'.

Of note, one or more of the zone storage components, e.g., the first, second, and third zone storage components, etc., can be androgynous zone storage component(s). As disclosed herein, an androgynous zone storage component can adapt to actual use or deployment conditions and can assume, or transition between, a front/back-end character. This can allow for the androgynous zone storage component to be incorporated into existing storage systems in a seamless manner. Moreover, it can enable a storage system in add or remove zone storage component(s), merge or divest with/from other storage systems, etc. In an aspect, for a storage system having M zones, with M ZSCs, local chunks from the $ZSC_1$ to the $ZSC_{(M-1)}$ can be compressed for storage on $ZSC_M$ by various techniques. As such, one or more of the M ZSCs in the storage system can act as either de facto front-end or back-end device. As an example, where M=3, the local chunks from the first ZSC and the second ZSC can be compressed and stored on the third ZSC. As a second example, where an additional ZSC is added, M can equal 4, wherein local chunks from the first ZSC, second ZSC, and fourth ZSC can be compressed and stored on the third ZSC. As a further example, where M is increased to 6, the local chunks from the 1st, 2nd, 4th, 5th, and 6th ZSC, can be compressed and stored on the 3rd ZSC. Moreover, for example, where M is increased to 4 and the third ZSC begins to store a local chunk, local chunks from the first ZSC, second ZSC, and third ZSC can be compressed and stored on the fourth ZSC, where the third ZSC is an androgynous zone storage component that allows it to automatically adapt from a back-end character to a front-end character in response to storing local chunk for the storage system.

Figure 6:
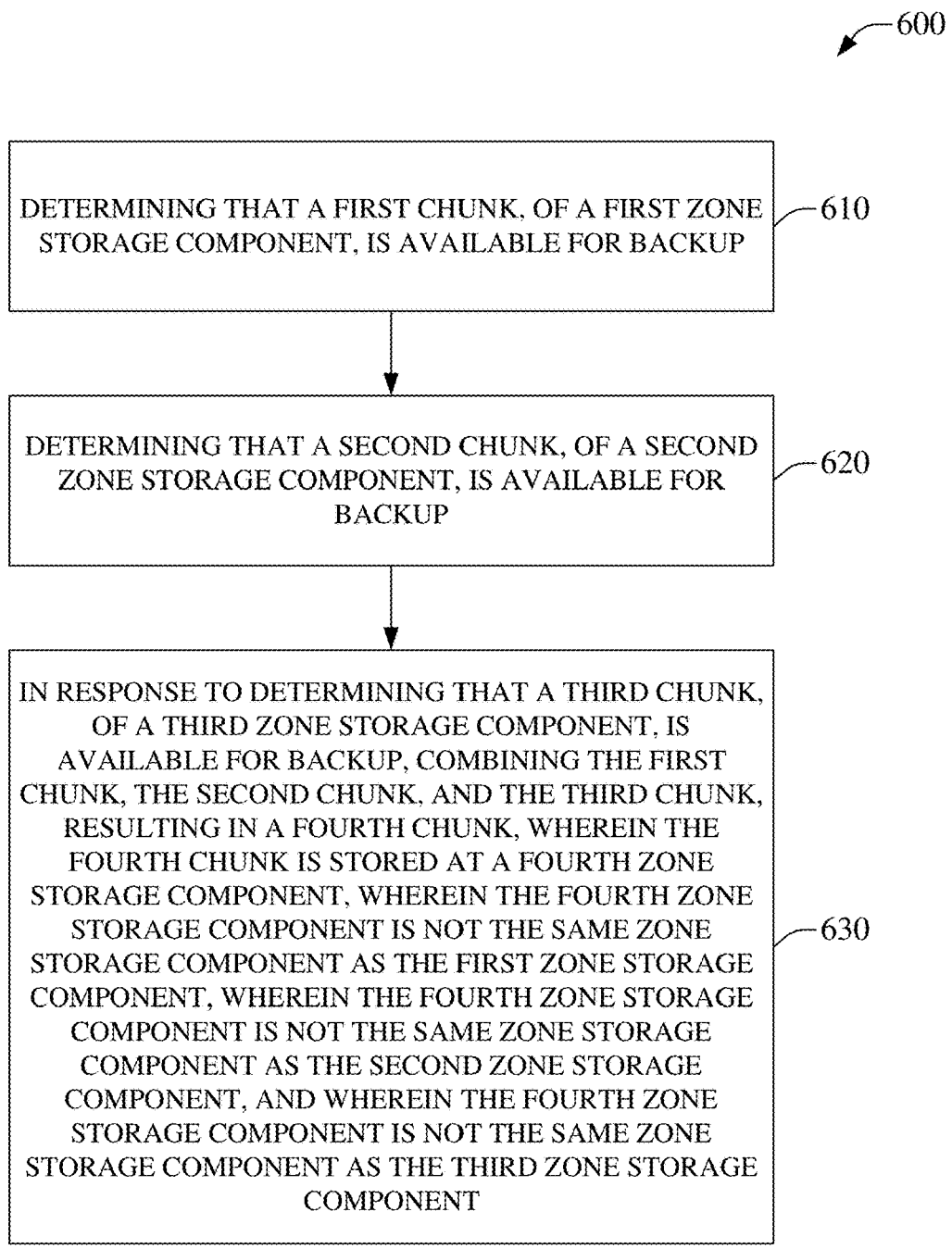
FIG. 6 is an illustration of an example method facilitating opportunistic geographically diverse storage of data, in accordance with aspects of the subject disclosure.

FIG. 6 is an illustration of an example method 600, which can facilitate opportunistic geographically diverse storage of data, in accordance with aspects of the subject disclosure. At 610, method 600 can comprise determining that a first chunk of a first zone storage component is available for backup. In an embodiment, the first zone storage component can be explicitly configured as a front-end device. In another embodiment, the first storage zone component can be an androgynous zone storage component and can act as a de facto front-end device. In an aspect, the first chunk can be a local chunk based on user input. In another aspect, the first chunk can be a partial chunk comprising, in a compressed form, data chunks from other zone storage components of a storage system. In an aspect, the storage system can be a geographically diverse storage system.

At 620, method 600 can comprise determining that a second chunk of a second zone storage component is available for backup. In an embodiment, the second zone storage component can be explicitly configured as a front-end device. In another embodiment, the second storage zone component can be an androgynous zone storage component and can act as a de facto front-end device. In an aspect, the second chunk can be a local chunk based on user input. In another aspect, the second chunk can be a partial chunk comprising, in a compressed form, data chunks from other zone storage components of a storage system.

At 630, method 600 can comprise combining, in response to determining that a third chunk is available for backup, the first, second, and third chunk into a fourth chunk. The third chunk can, in an embodiment, be a local chunk based on user input, be a partial chunk, etc. The fourth chunk can be a partial chunk or a complete chunk. In an embodiment, the third zone storage component can be explicitly configured as a front-end device, can be an androgynous zone storage component that can act as a de facto front-end device, etc. In an embodiment, the fourth zone storage component can be explicitly configured as a back-end device, can be an androgynous zone storage component that can act as a de facto back-end device, etc.

In an embodiment, the first zone storage component, the second zone storage component, the third zone storage component, and the fourth zone storage component, can each be different zone storage components. Accordingly, the first chunk, second chunk, and third chunk can be compressed and stored at a zone storage component, e.g., the fourth zone storage component, which does not contribute a local chunk to the data stored on the fourth zone storage component. In an aspect, the fourth chunk can be denoted as 'fourth chunk=XOR(first chunk, second chunk, third chunk)'.

Of note, one or more of the zone storage components, e.g., the first-fourth zone storage components, etc., can be androgynous zone storage component(s). As disclosed herein, an androgynous zone storage component can adapt to actual use or deployment conditions and can assume, or transition between, a front/back-end character. This can allow for the androgynous zone storage component to be incorporated into existing storage systems in a seamless manner. Moreover, it can enable a storage system in add or remove zone storage component(s), merge or divest with/from other storage systems, etc.

Figure 7:
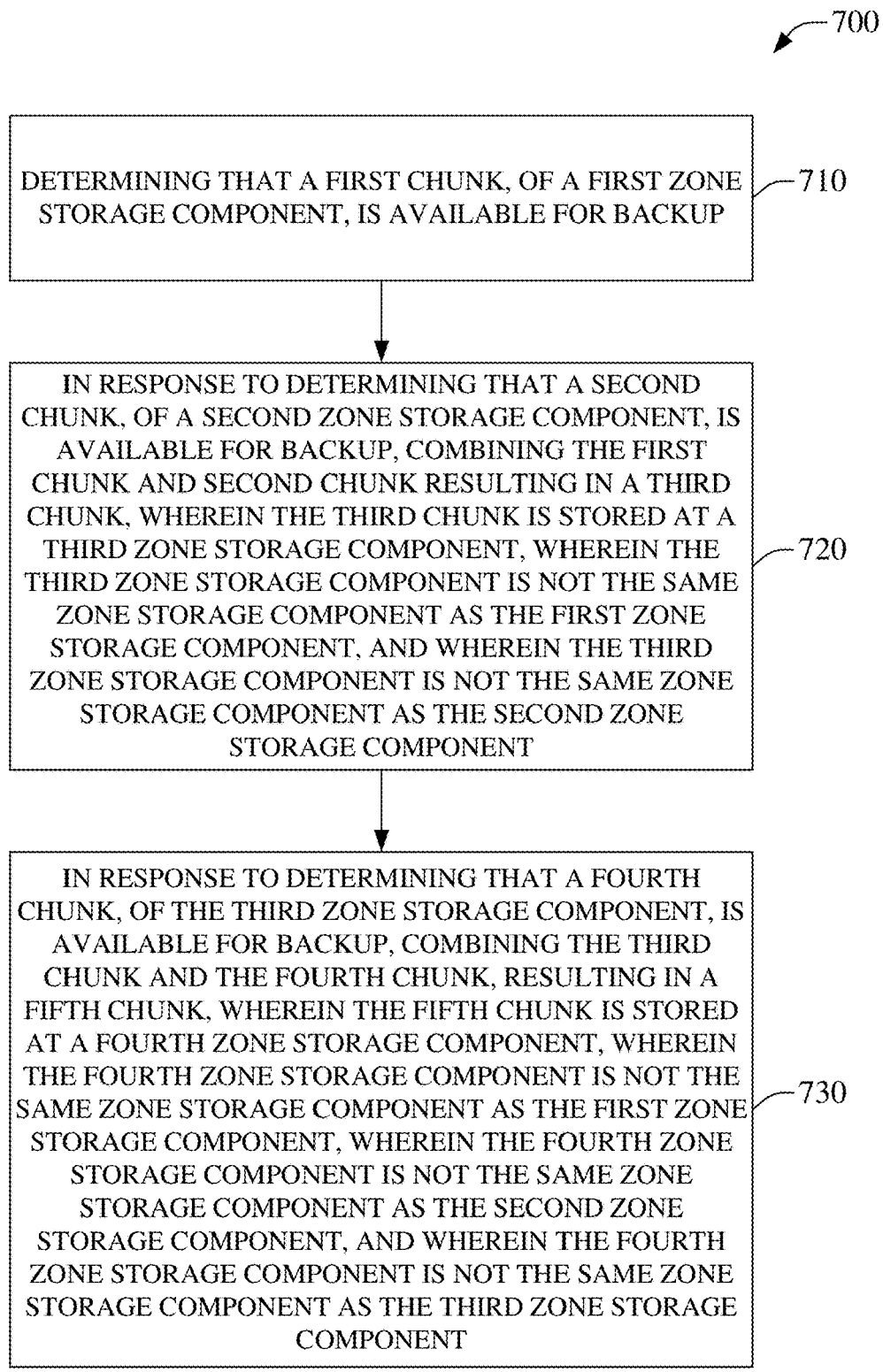
FIG. 7 is an illustration of an example method facilitating opportunistic geographically diverse storage of data employing a data chunk comprising data from less than all data zones of a group of data zones, in accordance with aspects of the subject disclosure.

FIG. 7 is an illustration of an example method 700, which can facilitate opportunistic geographically diverse storage of data employing a data chunk comprising data from less than all data zones of a group of data zones, in accordance with aspects of the subject disclosure. At 710, method 700 can comprise determining that a first chunk of a first zone storage component is available for backup. In an embodiment, the first zone storage component can be explicitly configured as a front-end device. In another embodiment, the first storage zone component can be an androgynous zone storage component and can act as a de facto front-end device. In an aspect, the first chunk can be a local chunk based on user input. In another aspect, the first chunk can be a partial chunk comprising, in a compressed form, data chunks from other zone storage components of a storage system. In an aspect, the storage system can be a geographically diverse storage system.

At 720, method 700 can comprise combining, in response to determining that a second chunk is available for backup, the first and second chunk into a third chunk. The second chunk can, in an embodiment, be a local chunk based on user input, be a partial chunk, etc. The third chunk can be a partial chunk. In an embodiment, the second zone storage component can be explicitly configured as a front-end device, can be an androgynous zone storage component that can act as a de facto front-end device, etc. In an embodiment, the third zone storage component can be explicitly configured as a back-end device, can be an androgynous zone storage component that can act as a de facto back-end device, etc.

At 730, method 700 can comprise combining, in response to determining that a fourth chunk is available for backup, the third and fourth chunk into a fifth chunk for storage on a fourth ZSC. The fourth chunk can, in an embodiment, be a local chunk based on user input, be a partial chunk, etc. The fifth chunk can be a partial chunk or a complete chunk. In an embodiment, the third zone storage component can be explicitly configured as a front-end device, can be an androgynous zone storage component that can act as a de facto front-end device, etc. In an embodiment, the fourth zone storage component can be explicitly configured as a back-end device, can be an androgynous zone storage component that can act as a de facto back-end device, etc.

In an embodiment, the first zone storage component, the second zone storage component, the third zone storage component, and the fourth zone storage component, can each be different zone storage components. Accordingly, the first chunk, and second chunk can be compressed and stored at a zone storage component, e.g., the third zone storage component, that does not initially contribute a local chunk to the data stored on the third zone storage component. Where the third and fourth chunk are then compressed into fifth chunk, the fifth chunk can be stored on the fourth zone storage component, to avoid storage of a chunk comprising the compressed representation of the fourth chunk data on the same ZSC as is storing the fourth chunk itself, e.g., the 3rd ZSC should not store both the fourth chunk and the compressed backup embodying the fourth chunk because this typically defeats the benefits of geographically diverse storage devices. In an aspect, the fifth chunk can be denoted as 'fifth chunk=XOR(fourth chunk, third chunk)', wherein the 'third chunk=XOR (first chunk, second chunk)'. Alternately, the fifth chunk can be denoted as 'fifth chunk=XOR (fourth chunk, XOR(first chunk, second chunk)', wherein the first and second chunks are compressed into a first partial chunk, e.g., the third chunk, before the fourth chunk is compressed with the first partial chunk to form a second partial chunk, e.g., the fifth chunk, that can be stored at a fourth ZSC.

Of note, one or more of the zone storage components, e.g., the first-fourth zone storage components, etc., can be androgynous zone storage component(s). As disclosed herein, an androgynous zone storage component can adapt to actual use or deployment conditions and can assume, or transition between, a front/back-end character. This can allow for the androgynous zone storage component to be incorporated into existing storage systems in a seamless manner. Moreover, it can enable a storage system in add or remove zone storage component(s), merge or divest with/from other storage systems, etc.

Figure 8:
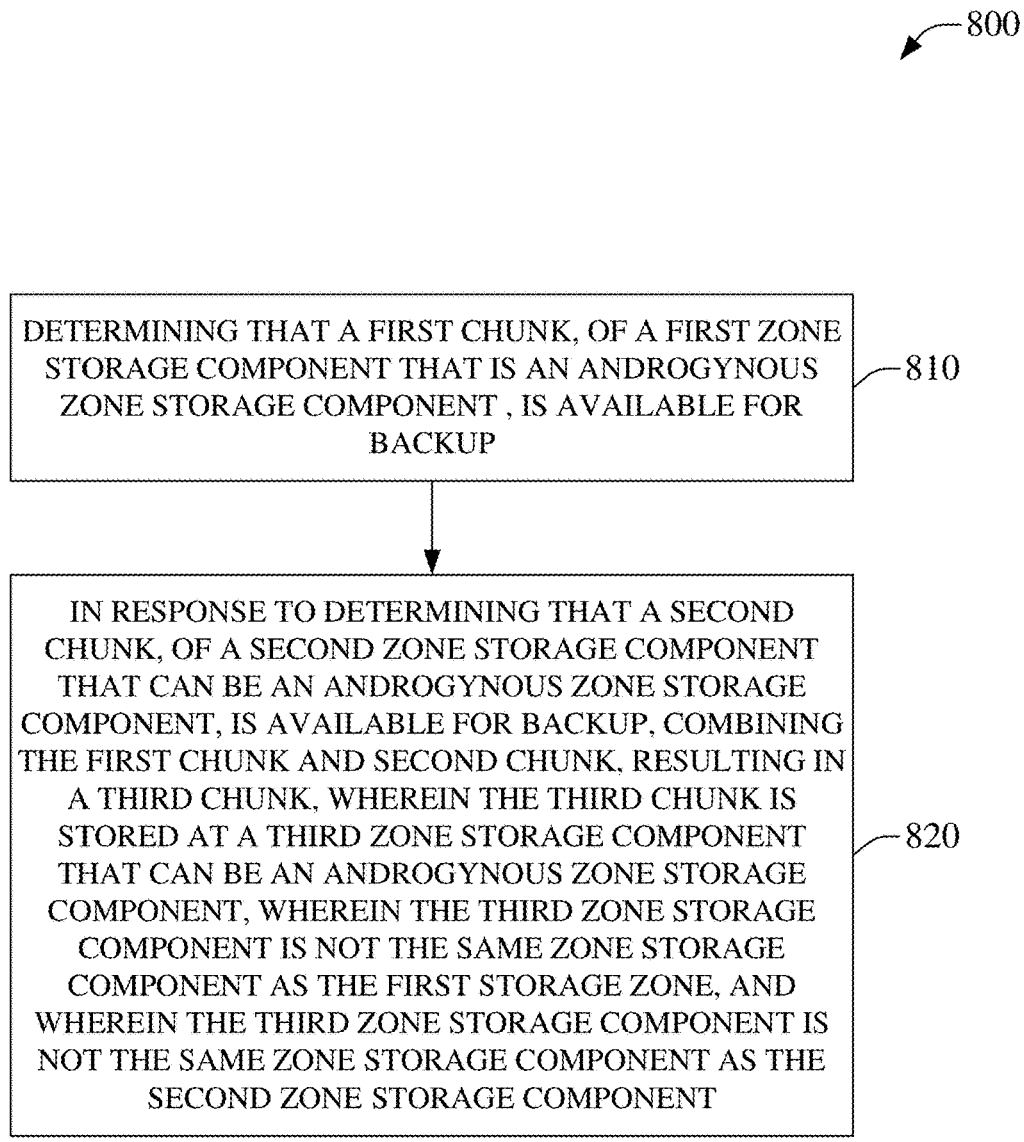
FIG. 8 illustrates an example method that enables opportunistic geographically diverse storage of data via an androgynous zone storage component, in accordance with aspects of the subject disclosure.

FIG. 8 is an illustration of an example method 800, which can enable opportunistic geographically diverse storage of data via an androgynous zone storage component, in accordance with aspects of the subject disclosure. At 810, method 800 can comprise determining that a first chunk of a first androgynous zone storage component is available for backup. In an embodiment, the first storage zone component, as an androgynous zone storage component, can act as a de facto front-end device based on storing a local chunk, e.g., where the first chunk can be a local chunk based on user input. In another embodiment, the first storage zone component, as an androgynous zone storage component, can act as a de facto back-end device based on storing a partial chunk, e.g., where the first chunk can be a partial chunk comprising, in a compressed form, data chunks from other zone storage components of a storage system. In an aspect, the storage system can be a geographically diverse storage system.

At 820, method 800 can comprise combining, in response to determining that a second chunk is available for backup, the first and second chunk into a third chunk. The second chunk can, in an embodiment, be a local chunk based on user input, be a partial chunk, etc. The third chunk can be a partial chunk or a complete chunk. In an embodiment, the second zone storage component can be an androgynous zone storage component that can act as a de facto front/back-end device, etc. In an embodiment, the third zone storage component can be an androgynous zone storage component that can act as a de facto front/back-end device, etc.

In an embodiment, the first zone storage component, the second zone storage component, and the third zone storage component can each be different zone storage components. Accordingly, the first chunk and second chunk can be compressed and stored at a zone storage component, e.g., the third zone storage component, whereby the third zone storage component does not contribute a chunk to the data stored on the third zone storage component. In an aspect, the third chunk can be denoted as 'third chunk=XOR(first chunk, second chunk)'. Of note, the goal of not storing both a chunk and the backup comprising the chunk on the same ZSC typically results in storing the chunk on the originating ZSC and the backup on different ZSC, however this does not preclude the possibility of storing both on the same ZSC, for example in a temporary file as part of eventually storing the backup chunk on a different ZSC, where a another ZSC is unavailable, etc.

Of note, one or more of the zone storage components, e.g., the first, second, and third zone storage components, etc., can be androgynous zone storage component(s). As disclosed herein, an androgynous zone storage component can adapt to actual use or deployment conditions and can assume, or transition between, a front/back-end character. This can allow for the androgynous zone storage component to be incorporated into existing storage systems in a seamless manner. Moreover, it can enable a storage system in add or remove zone storage component(s), merge or divest with/from other storage systems, etc.

Figure 9:
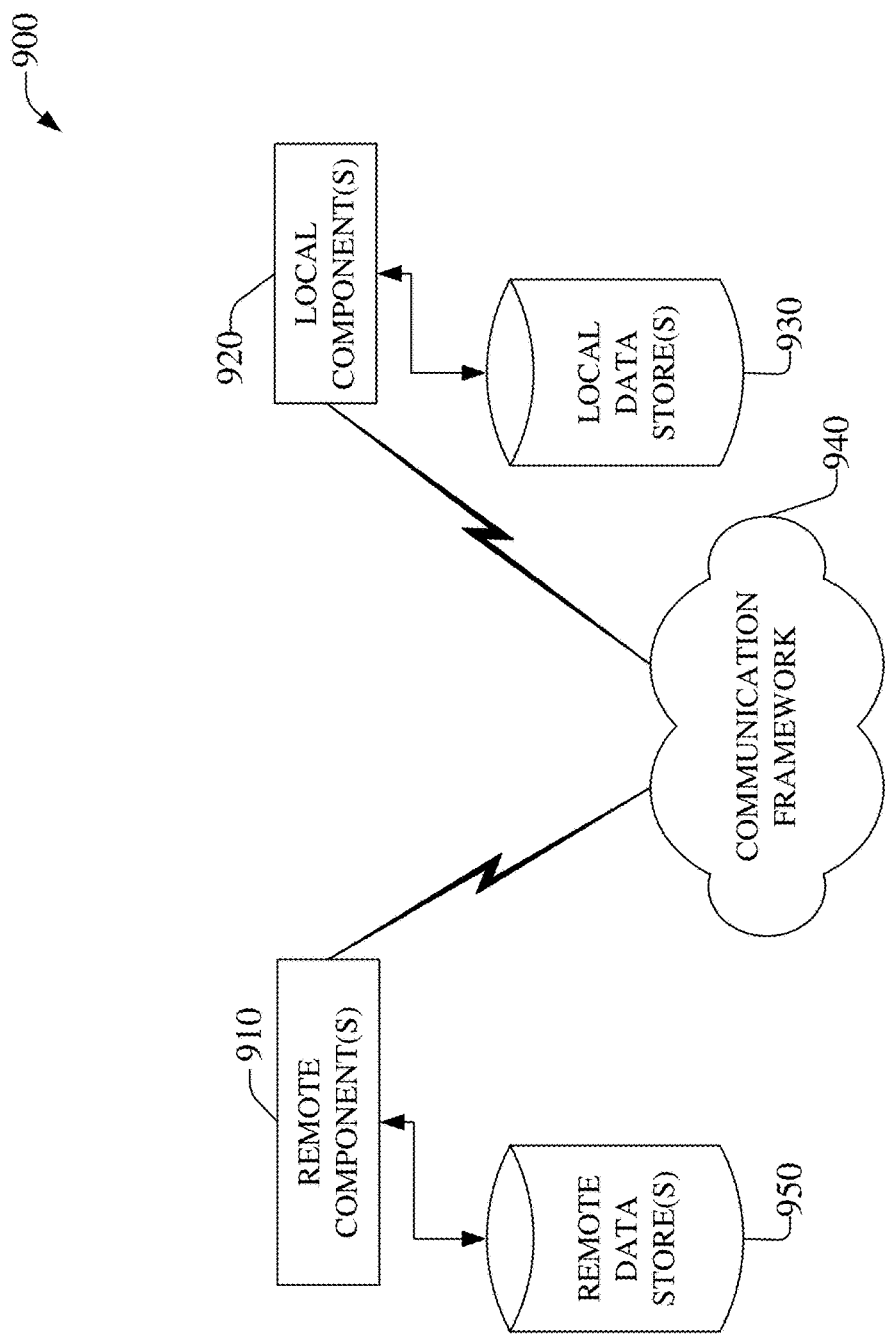
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940, that can be the same as, or similar to, communication framework 202, and can comprise radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in ZSC 110-130, ZSC 210-260, ZSC 310-360, ZSC 410-460, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate compression and storage in partial or complete chunks on a ZSC as disclosed herein.

Figure 10:
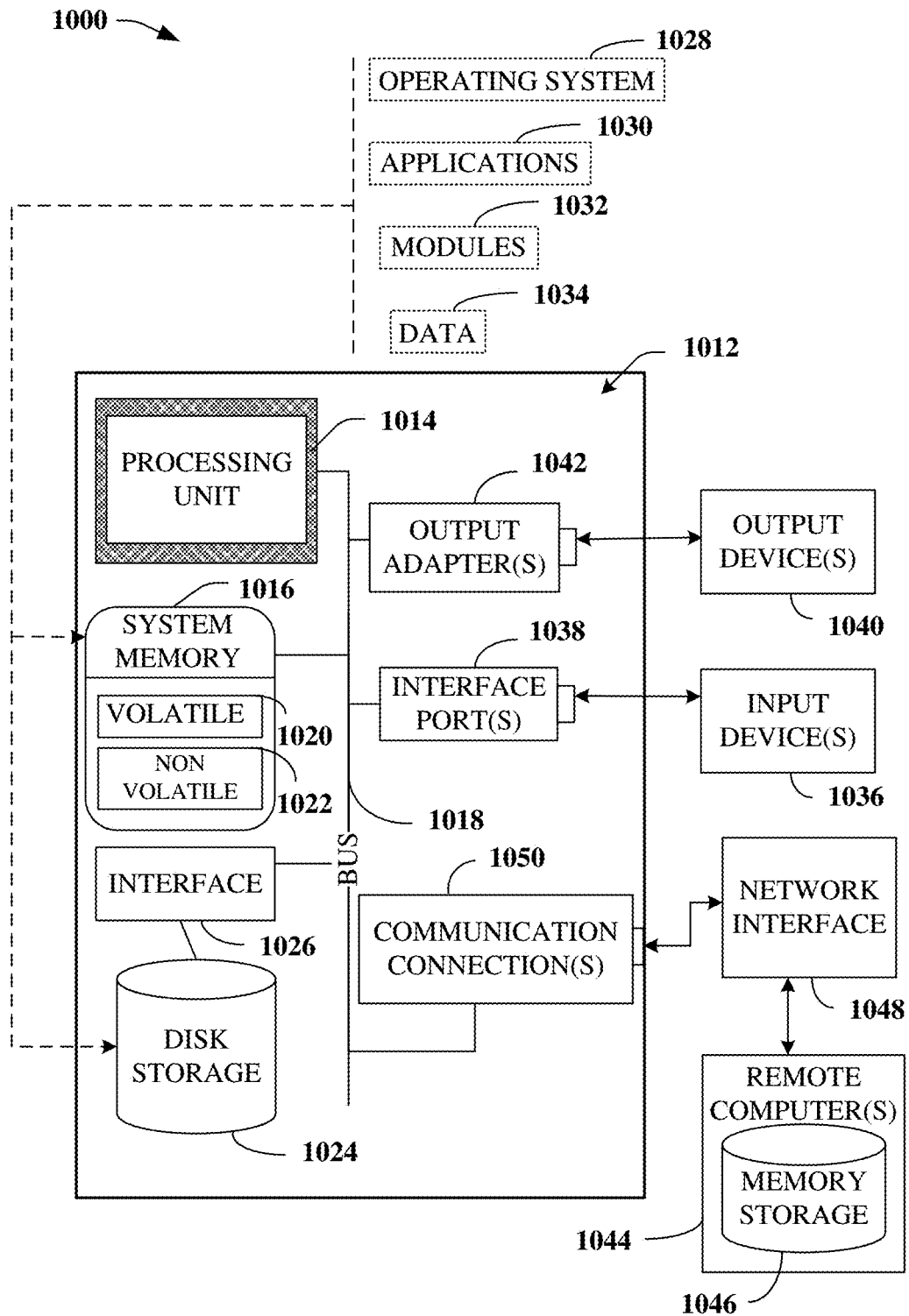
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC, e.g., 110-130, 210-260, 310-360, 410-460, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising storing a compressed group of chunks from first ZSCs, e.g., 110-130, 210-260, 310-360, 410-460, etc., as a partial or complete chunk at another ZSC, e.g., 110-130, 210-260, 310-360, 410-460, etc., as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        determining a number of data zones comprising a distributed storage construct;
        determining that a count of ready data chunks is less than the number of data zones, wherein the ready data chunks comprise a first data chunk stored in a first zone storage device corresponding to a first data zone of the data zones and a second data chunk stored in a second zone storage device corresponding to a second zone of the data zones; and
        in response to combining the first data chunk and the second data chunk into a first combined data chunk, storing the first combined data chunk in a third zone storage device corresponding to the a third data zone of the data zones, wherein the third zone storage device is not the same zone storage device as the first zone storage device, and wherein the third zone storage device is not the same zone storage device as the second zone storage device.

2. The system of claim 1, wherein the operations further comprise:
    in response to combining a third data chunk of the ready data chunks, wherein the third data chunk is stored in the third zone storage device, and the first combined data chunk into a second combined data chunk, storing the second combined data chunk in a fourth zone storage device corresponding to a fourth data zone of the data zones, and wherein the fourth zone storage device is not the same zone storage device as the first zone storage device, second zone storage device, or third zone storage device.

3. The system of claim 1, wherein the operations further comprise:
    in response to combining a third data chunk of the ready data chunks, wherein the third data chunk is stored in the fourth zone storage device corresponding to a fourth data zone of the data zones, and the first combined data chunk into a second combined data chunk, storing the second combined data chunk in a third zone storage device, wherein the fourth zone storage device is not the same zone storage device as the first zone storage device, second zone storage device, or third zone storage device.

4. The system of claim 1, wherein:
    the storing the first combined data chunk is in response to combining the first data chunk, the second data chunk, and a third data chunk of the ready data chunks;
    the third data chunk is stored in a fourth zone storage device corresponding to a fourth data zone of the data zones; and
    the fourth zone storage device is not the same zone storage device as the first zone storage device, second zone storage device, or third zone storage device.

5. The system of claim 1, wherein a difference between the number of data zones and the count of ready data chunks is one.

6. The system of claim 1, wherein a difference between the number of data zones and the count of ready data chunks is greater than one.

7. The system of claim 1, wherein the first combined data chunk comprises a time stamp value to enable determining an age of the first combined data chuck, wherein the time stamp value facilitates formation of a subsequent data chunk at a time in the future, wherein the subsequent data chunk is a combination of the first combined data chunk and another data chunk or another combined data chunk, and wherein the first combined data chunk is selected for combination with the other data chunk or the other combined data chunk based on the age of the first combined data chunk.

8. The system of claim 1, wherein the first combined data chunk comprises a zone identifier value to enable determining identities of data zones corresponding to the first and second data chunks combined into the first combined data chuck to facilitate formation of a subsequent data chunk at a time in the future, wherein the subsequent data chunk is a combination of the first combined data chunk and another data chunk or another combined data chunk, and wherein the first combined data chunk is selected for combination with the other data chunk or the other combined data chunk based on the zone identifier value.

9. The system of claim 8, wherein the first combined data chunk is selected for combination with the other data chunk or the other combined data chunk based on an identity of a data zone of the data zones determined from the zone identifier value.

10. The system of claim 8, wherein the first combined data chunk is selected for combination with the other data chunk or the other combined data chunk based on a count of zones represented in the first combined data chunk, and wherein the count is determined from the zone identifier value.

11. A first zone storage device, comprising:
a processor; and
a memory that stores executable instructions that, when executed by the processor, facilitate performance of operations, comprising:
determining a number of data zones comprising a distributed storage construct;
determining that a count of ready data chunks is less than the number of data zones, wherein the ready data chunks comprise a first data chunk stored in the first zone storage device corresponding to a first data zone of the data zones and a second data chunk stored in a second zone storage device corresponding to a second zone of the data zones;
enabling combining the first data chunk and the second data chunk resulting in a first combined data chunk; and
enabling storing of the first combined data chunk on a third zone storage device, wherein the first zone storage device is not a same zone storage device as the second or third zone storage device, wherein the second zone storage device is not a same zone storage device as the first or third zone storage device, and wherein the third zone storage device is not a same zone storage device as the first or second zone storage device.

12. The first zone storage device of claim 11, wherein the operations further comprise:
determining that a third data chunk stored on a fourth zone storage device is available for back up,
wherein the enabling combining comprises combining the first, second, and third data chunk into the first combined data chunk,
wherein the first zone storage device is not a same zone storage device as the second, third, or fourth zone storage device,
wherein the second zone storage device is not a same zone storage device as the first, third, or fourth zone storage device,
wherein the third zone storage device is not a same zone storage device as the first, second, or fourth zone storage device, and
wherein the fourth zone storage device is not a same zone storage device as the first, second, or third zone storage device.

13. The first zone storage device of claim 11, wherein the enabling the combining comprises combining the first data chunk and the second data chunk into the first combined data chunk by the first zone storage device.

14. The first zone storage device of claim 11, wherein the enabling the combining comprises allowing access to the first data chunk to enable the first data chunk and the second data chunk to be combined into the first combined data chunk by a device other than the first zone storage device.

15. The first zone storage device of claim 14, wherein the device other than the first zone storage device is the third zone storage device.

16. The first zone storage device of claim 14, wherein the device other than the first zone storage device is also not the second zone storage device or the third zone storage device.

17. A method, comprising:
determining, by a system comprising a processor, a number of data zones comprising a distributed storage construct;
determining, by the system, that a count of ready data chunks is less than the number of data zones, wherein the ready data chunks comprise a first data chunk stored in a first zone storage device corresponding to a first data zone of the data zones and a second data chunk stored in a second zone storage device corresponding to a second zone of the data zones;
combining, by the system via an exclusive-or operation, the first data chunk and the second data chunk resulting in a first combined data chunk; and
storing, by the system, the first combined data chunk at a third zone storage device, wherein the first zone storage device is a different zone storage device from the second or third zone storage device, wherein the second zone storage device is a different zone storage device from the first or third zone storage device, and wherein the third zone storage device is a different zone storage device from the first or second zone storage device.

18. The method of claim 17, wherein the combining comprises performing the exclusive-or operation by the first zone storage device.

19. The method of claim 17, wherein the combining comprises performing the exclusive-or operation by the third zone storage device.

20. The method of claim 17, wherein the combining comprises performing the exclusive-or operation by a device other than the first zone storage device, the second zone storage device, or the third zone storage device.

* * * * *